: 3,661,777
Patented May 9, 1972

---

3,661,777
THIXOTROPIC COLLOIDAL LEAD-CONTAINING COMPOSITION
Mack W. Hunt, Lynn C. Rogers, and Roy C. Sias, Ponca City, Okla., assignors to Continental Oil Company, Ponca City, Okla.
No Drawing. Filed Nov. 24, 1969, Ser. No. 879,605
Int. Cl. C10m 5/22
U.S. Cl. 252—33
24 Claims

ABSTRACT OF THE DISCLOSURE

Thixotropic colloidal dispersions of lead oxide are disclosed broadly. These materials are prepared by treating a fluid, overbased lead dispersion with an active hydrogen compound (e.g. water or water-alcohol mixtures). Preferably, yellow lead oxide is used to prepare the fluid, overbased lead dispersion. The thixotropic colloidal dispersion of lead oxide is useful as a corrosion inhibitor and as a grease.

BACKGROUND

Overbased metal dispersions are well-known. The term is used to describe materials containing an excess of metal over that required to neutralize the dispersing agent (usually a sulfonic acid). In addition to the term overbased, other terms such as superbased and hyperbased have been used to describe these types of materials. In general these materials are characterized as being relatively non-viscous, i.e. they are fluid and pourable. They are not characterized as having grease-like or thixotropic properties.

While numerous patents teach the preparation of overbased barium and calcium dispersions, to our knowledge there is not much information on the preparation of dispersions containing excess lead compounds. Canadian Pat. No. 791,118, which issued July 30, 1968, does teach the preparation of such a composition.

U.S. Pat. No. 3,242,079 teaches that certain overbased materials (e.g. those containing dispersed calcium carbonate) can be converted to a thickened composition having the physical properties of a grease. The overbased composition, containing dispersed calcium carbonate, is converted to the grease-like composition by treating it with an active hydrogen compound (e.g. water, water-alcohol mixtures or a lower carboxylic acid).

U.S. Pat. No. 3,384,586 teaches a composition wherein one of the components is similar to that of U.S. 3,242,079. However, '586 describes the material as being a non-Newtonian colloidal disperse system.

We have discovered that certain overbased lead-containing dispersions (as described hereinafter) can be converted to compositions which are thixotropic and grease-like. The materials of our invention are useful as corrosion inhibitors and greases.

Prior art

The most pertinent prior art is believed to be the following: Canadian Pat. No. 791,118; U.S. Pat. No. 3,242,079 and U.S. Pat. No. 3,384,586.

Canadian Patent No. 791,118 teaches a process for preparing dispersions containing excess lead compounds. A salient feature of the process is the use of yellow lead oxide (lithage) in preparing the dispersions. The patent contains no teachings, however, that these lead-containing dispersions can be converted to thixotropic or grease-like compositions.

U.S. 3,242,079 teaches that the starting material for preparing the grease-like composition is a mineral oil solution of a carbonated, basic alkaline earth metal salt. In other words the dispersed material is an alkaline earth metal carbonate.

U.S. 3,384,586 teaches the preparation of a grease-like composition from an overbased metal composition. In describing the overbased metal composition, which is used to prepare the grease-like composition, the patent broadly discloses that lead oxide can be used in the preparation of the overbased metal composition. However, in describing the preparation of the overbased metal composition, the patent teaches blowing the admixture with an inorganic acidic material such as HCl, $SO_2$, $SO_3$, $CO_2$, $H_2S$, $N_2O_3$, etc. In other words, assuming that lead oxide is used as a starting material for the preparation of the fluid, overbased dispersion, blowing with $CO_2$ would provide a carbonated product, which is presumably lead carbonate or basic lead carbonate. We have discovered that dispersions containing lead oxide are suitable for preparing thixotropic, or grease-like compositions, but that dispersions that have been carbonated are not suitable for preparing this type of highly thixotropic composition.

We wish to emphasize that we are not suggesting that the invention of U.S. 3,384,586 is inoperative. The preferred disperse systems of the patent are made from overbased materials containing calcium and/or barium as the metal. The patent does not have an example showing the conversion of a carbonated lead dispersion to a grease-like system. In the light of our work we do believe, however, that the broad teachings of the patent are beyond the scope of the invention thereof.

BRIEF SUMMARY OF THE INVENTION

Broadly stated, the present invention concerns a thixotropic colloidal dispersion comprising:

(a) from about 20 to about 95 parts by weight nonvolatile diluent oil,
(b) from about 20 to about 45 parts by weight oil-soluble dispersing agent,
(c) from about 15 to about 40 parts lead oxide, said composition having a dropping point of at least 200° F., preferably at least 300° F., and as having a metal ratio of at least 3.5.

In another aspect the invention relates to a solution of the above-described composition in a volatile solvent.

In still another aspect the invention relates to a process for preparing a thixotropic composition wherein the process comprises heating at a temperature in the range of from about 50 to about 100° C. an admixture which comprises:

(a) a fluid overbased lead dispersion comprising:
  (i) from about 20 to about 60 parts by weight nonvolatile diluent oil,
  (ii) from about 20 to about 45 parts by weight oil-soluble dispersing agent,
  (iii) from about 15 to about 40 parts by weight of lead compounds selected from the group consisting of lead oxide and lead alkoxides,
(b) from about 10 to about 45 percent by weight, based on said fluid overbased lead dispersion, of an active hydrogen compound, which can be water, water-alcohol mixtures, a lower carboxylic acid, or a mixture of water and a lower carboxylic acid.

In a preferred embodiment of this aspect, after completion of the refluxing the volatile materials are removed by distillation.

In yet another aspect the invention relates to the product prepared by the above-described process.

In a further aspect the invention relates to the use of the thixotropic colloidal dispersion as a corrosion inhibitor for metals.

DETAILED DESCRIPTION

We believe that our invention can best be understood by describing first the fluid overbased lead dispersion and its preparation; next, the conversion of the fluid, overbased lead dispersion to the thixotropic composition; and finally the properties of the thixotropic composition.

Preparation of the fluid, overbased lead dispersion

The materials which are used in the preferred process of preparing the fluid, overbased lead dispersion are a nonvolatile diluent, oil-soluble dispersing agent, lead oxide, and an alcohol. These will now be described in detail.

A wide variety of nonvolatile diluent oils are suitable in preparing the fluid, overbased lead dispersion. The principal requisite desired in the nonvolatile diluent oil is that it will act as a solvent for the dispersing agent which is used. Examples of nonvolatile diluent oils which can be used include mineral lubricating oils obtained by any of the conventional refining procedures; synthetic lubricating oils, such as polymers of propylene, polyoxyalkylenes, polyoxypropylene, dicarboxylic acid esters, and esters of phosphorous; synthetic hydrocarbon lubricating oils, such as dialkylbenzenes, diphenylalkanes, alkylated tetrahydronaphthalenes, and mixtures of these materials; vegetable oils, such as corn oil, cotton seed oil, and castor oil; and animal oils, such as lard oil and sperm oil. Of the preceding examples of nonvolatile diluent oils, the mineral lubricating oils and the synthetic lubricating oils are considered more suitable, with the mineral lubricating oils being preferred.

While we have used the term "nonvolatile diluent oil" herein, other terms can be used (and have been used elsewhere) to describe these particular components in colloidal dispersions. For example, the terms "diluent oil" and "nonvolatile carrier" have been used.

Suitable oil-soluble dispersing agents include the oil-soluble sulfonic acids, carboxylic acids, and the metal salts thereof. The term "oil-soluble sulfonic acids," as used herein, refers to those materials wherein the hydrocarbon portion of the molecule has a molecular weight in the range of about 300 to about 1,000. Preferably, this molecular weight is in the range of about 370 to about 700. These oil-soluble sulfonic acids can be either synthetic sulfonic acids or the so-called mahogany or natural sulfonic acids. The term "mahogany sulfonic acid" is believed to be well understood, since it is amply described in the literature. The term "synthetic sulfonic acids" refers to those materials which are prepared by sulfonation of hydrocarbon feedstocks which are prepared synthetically. The synthetic sulfonoic acids can be derived from either alkyl or alkaryl hydrocarbons. In addition, they can be derived from hydrocarbons having cycloalkyl (i.e., naphthenic) groups in the side chains attached to the benzene ring. The alkyl groups in the alkaryl hydrocarbons can be straight or branched chain. The alkaryl radical can be derived from benzene, toluene, ethyl benzene, xylene isomers, or naphthalene.

An example of a hydrocarbon feedstock which has been particularly useful in preparing synthetic sulfonic acids is a material known as postdodecylbenzene. Postdodecylbenzene is a bottoms product of the manufacture of dodecylbenzene. The alkyl groups of postdodecylbenzene are branched chain. Postdodecylbenzene consists of monoalkylbenzenes and dialkylbenzenes in the approximate mole ratio of 2:3 and has typical properties as follows:

| | |
|---|---|
| Specific gravity at 38° C. | 0.8649 |
| Average molecular weight | 385 |
| Percent sulfonatable | 88 |
| A.S.T.M. D-158 Engler: | |
| I.B.P., ° F. | 647 |
| 5° F. | 682 |
| 50° F. | 715 |
| 90° F. | 760 |
| 95° F. | 775 |
| F.B. P. ° F. | 779 |
| Refractive index at 23° C. | 1.4900 |
| Viscosity at: | |
| −10° C., centistokes | 2800 |
| 20 centistokes | 280 |
| 40 centistokes | 78 |
| 80 centistokes | 18 |
| Aniline point, ° C. | 69 |
| Pour point, ° F. | −25 |

An example of another hydrocarbon feedstock which is particularly useful in preparing synthetic sulfonic acids is a material referred to as dimer alkylate." "Dimer alkylate" has branched chain alkyl groups as does postdodecylbenzene. Briefly described, dimer alkylate is prepared by the following steps:

(1) Dimerization of a suitable feedstock, such as cat poly gasoline.

(2) Alkylation of an aromatic hydrocarbon with the dimer formed in step (1).

Preferably, the dimerization step uses a Friedel-Crafts alkylation sludge as the catalyst. This process and the resulting product are described in U.S. Pat. No. 3,410,925.

An example of another hydrocarbon feedstock which is particularly useful for preparing synthetic sulfonic acids which can be used in my invention is a material which I refer to as "NAB Bottoms." NAB Bottoms are predominantly di-n-alkyl aromatic hydrocarbons wherein the alkyl groups contain from 8 to 18 carbon atoms. They are distinguished primarily from the preceding sulfonation feedstocks in that they are straight chain and contain a large amount of di-substituted material. A process of preparing these materials and the resulting product are described in application Ser. No. 529,284, filed Feb. 23, 1966, and having the same assignee as the present application. The product is also described in U.S. Pat. No. 3,288,716, which is concerned with an additional use for the product, other than sulfonation feedstock. Another process of preparing a di-n-alkaryl product is described in application Ser. No. 521,794, filed Jan. 20, 1966, and having the same assignee as the present application.

In order to make my disclosure even more complete, application Ser. Nos. 529,284 and 521,794 and Pat. No. 3,410,925 are made a part of this disclosure.

The oil-soluble sulfonic acids and metal sulfonates are preferred for use in my process.

In addition to the sulfonic acids derived from the foregoing-described hydrocarbon feedstock, examples of other suitable sulfonic acids include the following: mono- and poly- wax-substituted naphthalene sulfonic acid, dinonyl naphthalene sulfonic acid, diphenyl ether sulfonic acid, naphthalene disulfide sulfonic acid, dicetyl thianthrene sulfonic acid, dialauryl beta-naphthol sulfonic acid, dicapryl nitronaphthalene sulfonic acid, unsaturated paraffin wax sulfonic acid, hydroxy substituted paraffin wax sulfonic acid, tetraamylene sulfonic acid, mono- and poly-chloro-substituted paraffin wax sulfonic acid, nitrosoparaffin wax sulfonic acid; cycloaliphatic sulfonic acid such as lauryl-cyclohexyl sulfonic acid, mono- and poly-wax-substituted cyclohexyl sulfonic acid, and the like.

Suitable carboxylic acids which can be used in preparing the colloidal dispersion used as a starting material include naphthenic acids, such as the substituted cyclopentane mono-carboxylic acids, the substituted cyclohexane monocarboxylic acids and the substituted aliphatic polycyclic monocarboxylic acids containing at least 15 carbon atoms. Specific examples include cetyl cyclohexane carboxylic acids, dioctyl cyclopentane carboxylic acids, dilauryl decahydronaphthalene and stearlyoctahydro indene carboxylic acids and the like and oil-soluble salts thereof. Suitable oil-soluble fatty acids are those containing at least 8 carbon atoms. For producing the object of this invention in liquid form, I prefer fatty acids which are liquids at ambient temperatures down to about 15° C. Specific examples include 2-ethyl hexanoic acid, pelargonic acid, oleic acid, palmitoleic acid, linoleic acid and ricinoleic acid. Naturally occurring mixtures of predominantly unsaturated fatty acids, such as tall oil fatty acids, are particularly suitable. Examples of commercially available tall oil fatty acids include the "Crofatols," available from Crosby Chemical Company and the "Acintols," available from Arizona Chemical Company.

It may be well to mention here that usually commercial sulfonic acids and sulfonates are not 100 percent acid or sulfonate. Instead, they are a mixture of sulfonic acid, or sulfonates with a nonvolatile diluent oil. For example the term "40% active sulfonic acid" refers to a composition containing 40% sulfonic acid.

It is necessary that a particular lead oxide be used in preparing the fluid, overbased dispersion. This requirement is for both the fluid overbased dispersion and for the conversion to the thixotropic composition. It is required that lead monoxide, which is also known as "yellow lead oxide," containing a major proportion in the massicot form be used. Moreover, it is preferred that the lead monoxide contain at least 85% in the massicot form.

Suitable alcohols for use in preparing the fluid, overbased lead dispersion include aliphatic alcohols containing 1 to 4 carbon atoms, monoether alcohols of ethylene glycol containing not more than 8 carbon atoms, and monoether alcohols of diethylene glycol containing not more than 8 carbon atoms. Of these the monoether alcohols of ethylene glycol are more suitable, with those containing not more than 4 carbon atoms being preferred. The monoether alcohols of ethylene glycol are available commercially under the trademarks "Cellosolve," methyl "Cellosolve" and butyl "Cellosolve."

The amounts of the foregoing materials which are used are shown below in tabular form.

| Material | Part by weight | | |
|---|---|---|---|
| | Suitable | More suitable | Preferre |
| Nonvolatile diluent oil | 20-60 | 25-45 | 37-40 |
| Oil-soluble dispersing agent | 20-45 | 30-40 | 30-33 |
| Lead monoxide | 15-40 | 28-35 | 28-31 |
| Alcohol | 50-200 | 100-175 | 130-140 |

It will be readily apparent to those skilled in this art that, upon removal of the alcohol the amounts of nonvolatile diluent oil, oil-soluble dispersing agent and lead compounds in the fluid, overbased lead dispersion will be substantially as shown in the foregoing. The dispersion may contain minor amounts of the alcohol either free or chemically combined with the lead.

In order that the fluid, overbased lead dispersion be suitable for conversion to a thixotropic composition it is desirable that it have a metal ratio of at least 3.5, usually at least 5.0, or even higher. The term "metal ratio" as used herein is defined as the ratio of the total amount of lead in the composition to the amount of lead theoretically combinable as a normal salt with the sulfonic or carboxylic acid used as the dispersing agent.

The process conditions for preparing the fluid, overbased lead dispersion are not critical. A particularly suitable procedure is as follows. An admixture of the lead monoxide and alcohol is first formed. This admixture is heated gently (to about 50° C.) for a short time (e.g. 30 minutes) to allow the lead monoxide to become substantially admixed in the alcohol. To the admixture of alcohol and lead monoxide the oil-soluble dispersing agent is added (usually the dispersing agent is in a volatile hydrocarbon solvent such as hexane). The resulting admixture is then heated for a short period of time (for example at 90° C. for 2 hours). At this point the nonvolatile diluent oil is added to the admixture. This is followed by removing the volatile materials by heating to a pot temperature of, preferably, 150° C. Optionally, at this point the admixture may be blown with nitrogen for a short time (e.g. 15 minutes) to remove additional volatile materials.

Conversion of the fluid, overbased lead dispersion to a thixotropic composition

The conversion of the fluid, overbased lead dispersion is effected by the contacting thereof with an active hydrogen compound. Preferably, the conversion is effected by heating the admixture of fluid, overbased lead dispersion and active hydrogen compound at a controlled temperature and for a controlled length of time, as described hereinafter.

Suitable active hydrogen compounds for this aspect of our invention are water, water-alcohol mixtures, and aliphatic carboxylic acids containing less than about eight carbon atoms. Suitable carboxylic acids include, formic acid, acetic acid, propionic acid, butyric acid, valeric acid and heptanoic acid. Of these acetic acid is preferred. Suitable alcohols for the water-alcohol mixture inclute aliphatic alcohols containing 1 to 4 carbon atoms, monoether alcohols of ethylene glycol containing 3 to 8 carbon atoms, and monoether alcohols of diethylene glycol containing 5 to 9 carbon atoms. Of these alcohols the monoether alcohols of ethylene glycol containing 3 to 8 carbon atoms are considered more suitable, with those containing 3 or 4 carbon atoms being preferred.

Still further, mixtures of water and alcohol are considered more suitable for the conversion step. Examples of more suitable water-alcohol mixtures include those containing from about 0.5 to about 10 parts of water per part of alcohol (weight basis). The preferred water-alcohol mixture contains from 1.8 to 4.5 parts of water per part of alcohol.

From the foregoing it is apparent that the most preferred conversion agent is a mixture of 1.8 to 4.5 parts of water per part of monoether alcohol of ethylene glycol containing 3 or 4 carbon atoms.

As stated previously herein the fluid, overbased lead dispersion may (and often does) contain minor amounts of alcohol either free or chemically combined with the lead (e.g. as a lead alkoxide). The water in the water-alcohol mixture will release the alcohol from the lead alkoxide. When stating the amount of conversion agent this amount includes any alcohol present in the overbased lead dispersion. Since an alcohol is used in the preferred process of preparing the fluid, overbased lead dispersion it has been our experience that usually sufficient alcohol is present to effect conversion when the required amount of water is added to obtain the desired water-alcohol ratio.

We have found the effective amounts of conversion agent (i.e. active hydrogen compound) to be as follows based on the fluid, overbased lead dispersion, considered on a nonvolatile basis, which will be defined hereinafter. A suitable amount of conversion agent is from about 10 to about 45 weight percent, with the preferred amount being from about 20 to about 35 weight percent.

Previously we have described the relative amounts of nonvolatile diluent oil, oil-soluble dispersing agent and lead oxide which are used in preparing the fluid, overbased lead dispersion. The total of these materials is the nonvolatiles referred to in the previous paragraph. While the product (i.e., fluid, overbased lead dispersion) contains some lead alkoxides this has such a minor effect on the overall nonvolatile weight that, from a practical viewpoint, the nonvolatiles in the product can be assumed to be the same as the nonvolatiles in the starting materials.

On conversion of the fluid, overbased lead dispersion, which contains the relative amounts previously described, the resulting thixotropic composition is usually quite viscous, in other words as a grease it has a very low penetration. In order to adjust the consistency of the grease it is necessary to add additional nonvolatile diluent oil. In some instatnces, this addition of nonvolatile diluent oil is made prior to the conversion.

Moreover, when the thixotropic composition is to be used as a corrosion inhibiting agent it is usually desirable that it be present in a volatile solvent (e.g. Stoddard solvent). It is often desirable that this volatile solvent be added to the fluid, overbased lead dispersion prior to the conversion.

For the foregoing reasons we have stated the effective amounts of conversion agent as being based on nonvolatiles. It being understood that when additional nonvolatile diluent oil is added prior to conversion this is not included in the total of nonvolatiles.

The conversion of the fluid, overbased lead dispersion is effected by forming an admixture of the dispersion and the active hydrogen compound (conversion agent) in a suitable reaction vessel. The admixture is then heated at a temperature in the range of from about 50 to about 100° C. for a controlled length of time. Preferably, the admixture is heated at reflux temperature, which in the work we have done has been in the range of about 94 to 97° C. A minimum time is required to effect conversion while an excessive heating time results in a decrease in the viscosity of the product. Having described the results of both an insufficient and an excessive heating time we now describe a suitable heating time as being that time required to effect conversion and being in the range of from about one-sixth to about 10 hours. More suitably, when the admixture is heated at reflux temperature, the reflux time is from about 1 hour to about 4 hours. Preferably, the reflux time is from about 1.5 to 2.5 hours.

After completion of the refluxing, usually all, or a substantial portion, of the volatile materials are removed by distillation. It should be emphasized that removal of the volatile materials is not necessary. This is often the case when a volatile hydrocarbon solvent is present during conversion. The solution of thixotropic product can be applied to a metal. After evaporation of the solvent the thixotropic product provides corrosion protection for the metal. In other words, removal of volatile materials depends on ultimate use of the thixotropic product. If used as a grease, they are removed. If used as a corrosion inhibitor, removal is optional.

When the conversion agent is water or water-alcohol mixture the thixotropic product contains substantially amorphous lead oxide as shown by X-ray analysis. It is of interest in this connection that when insufficient conversion agent is used the lead oxide is crystalline as shown by X-ray analysis.

It is apparent, of course, that when a lower aliphatic carboxylic acid is used as the conversion agent the thixotropic product will contain a lead carboxylate. As noted hereinbefore, however, the lower aliphatic carboxylic acids are the least suitable conversion agent.

The thixotropic product of our invention

The preferred ([1]) thixotropic product has the following composition:

| Component | Parts by weight | | |
| --- | --- | --- | --- |
| | Suitable | More suitable | Preferred |
| Nonvolatile diluent oil | 120-95 | 25-45 | 37-40 |
| Oil-soluble dispersing agent | 20-45 | 30-40 | 30-33 |
| Lead oxide | 15-40 | 28-35 | 28-31 |

[1] The upper limit here differs from that shown in connection with the description of the process since in some instances additional nonvolatile diluent oil is added to the product, after conversion, to adjust the consistency thereof.

The composition has a dropping point of at least 200° F., preferably at least 300° F.

Uses for the thixotropic product

In addition to being useful as a grease the thixotropic product of our invention is also useful as a corrosion inhibitor for metal surfaces. When used as a corrosion inhibitor it is often advantageous to use a solution of the thixotropic product in a volatile solvent. The material to be protected can be coated by brushing or spraying with a solution of the thixotropic product. Or if desired, the material can simply be dipped in a solution of the thixotropic product. Evaporation of the solvent leaves a film of the thixotropic product which provides excellent protection. As stated previously, it is often desirable that this solvent is added prior to the conversion of the fluid, overbased lead product to the thixotropic product. However, the volatile solvent can be added to the thixotropic product after conversion.

The nature of the volatile solvent is not particularly important, and it is believed those skilled in this art, without undue experimentation, can readily ascertain suitable solvents. Examples of suitable solvents include volatile hydrocarbon solvents, such as Stoddard solvent, kerosene, petroleum naphtha, and the like. Also, certain nonflammable chlorohydrocarbons are suitable. For reasons of safety, it is preferable to use solvents having a flash point of at least 100° F., and even higher. I have found a suitable amount of solvent is in the range of from about 20 to about 80 percent by weight.

In order to disclose the nature of the present invention the following examples, both illustrative and comparative, will be given. It is to be understood, however, that the invention is not to be limited to the specific conditions or details set forth in these examples except insofar as such limitations are specified in the appended claims.

The tests employed herein were as follows:

Penetration—ASTM D-1403
Dropping point—ASTM D-1263
Water washout—ASTM D-1264-63

EXAMPLE 1

This example illustrates the preparation of the fluid, overbased lead dispersion, containing 30% active (sulfonate) and 35% lead.

Materials:

200 grams sulfonic acid [1]
41.3 grams 100 pale oil
325 ml. methoxy ethanol (methyl "Cellosolve")
78.4 grams lead monoxide (yellow lead oxide—J. T. Baker's No. 2338)

Procedure:

The methoxy ethanol and lead monoxide were added to a one-liter creased flask, equipped with a mechanical stirrer. The admixture was heated to 50° C. and held at this temperature for 30 minutes while stirring. The sulfonic acid was added and the resulting admixture was heated to 90° C. and held at this temperature for two hours. The pale oil was then added. The volatile materials distilling below 150° C. were removed by heating to a pot temperature of 150° C. This was followed by blowing the product with nitrogen for 15 minutes. A fluid product resulted which contained 30% lead (calculated). The amount of product was 221.7 grams.

EXAMPLE 2

This example illustrates the conversion of the fluid, overbased lead dispersion of Example 1 to a thixotropic composition in the presence of a volatile hydrocarbon solvent.

To the product of Example 1 there was added 138 grams of Stoddard solvent. The admixture was heated to 60° C. and 41.5 ml. water (19% based on non-volatiles) were added with mechanical mixing. The admixture was then heated at reflux temperature (95-97° C.) for two hours. The volatile materials distilling below 155° C. were taken overhead by heating to a pot temperature of 155° C. The resulting product weigher 306.5 grams. Additional Stoddard solvent was added to the product bringing the

---

[1] The preferred product is prepared using water-alcohol mixtures as the conversion agent.

[1] Prepared by sulfonation of a 70/30 blend of dimer alkylate and stripped "NAB" Bottoms. A hexane solution of the sulfonic acid was used. The material had the following analysis:
Total acidity=0.597 meq./g.
Sulfonic acidity=0.569 meq./g.
Combining weight of sulfonic acid=445
Non-volatiles=44.2% (wt.)

total product weight to 345 grams. This product had the following analysis:

Viscosity, cps.[1] at 77° F. _____ 2968
Nonvolatiles, wt. percent _____ 62.0
Lead, wt. percent _____ 20.7
Dispersing agent (as Pb sulfonate) _____ 18.7

[1] Brookfield No. 3 spindle, 12 r.p.m.

EXAMPLE 3

This example illustrates the utility of the thixotropic composition of Example 2 as a corrosion inhibitor.

A cold rolled, mild steel coupon, having a bright clean finish, was coated with the composition of Example 2. The solvent-free film thickness on the coupon was 1.4 mils. The coated coupon was tested using the ASTM B–117 salt fog test. The results were as follows:

Perfect protection, hours (Percent)
24 _____ 100
100 _____ 95

By comparison, an uncoated steel coupon, used as a control, was severly rusted (0% protection) in 4 hours.

EXAMPLE 4

This example illustrates the preparation of a thixotropic composition of our invention having the consistency (i.e. penetration) of a commercial grease.

Using a procedure similar to that of Example 1 a fluid overbased lead dispersion was prepared. Then, using a procedure similar to that of Example 2, the fluid overbased lead dispersion was converted to a thixotropic composition in the presence of Stoddard solvent. The composition had the following analysis:

Viscosity, cps. at 77° F.[1] _____ 1492
Nonvolatiles, wt. percent _____ 59.0
Lead, wt. percent _____ 20.0
Dispersing agent (as Pb sulfonate) _____ 18.7

[1] Same procedure as in Example 2.

Eight hundred grams of this composition were added to a Hobart mixer and the volatile materials were removed by heating to a pot temperature of 170° C., under house vacuum, for a two-hour period. In order to adjust the consistency of the product, 500 grams of bright stock lubricating base oil stock was added over a short period of time while maintaining the temperature at 100 to 150° C. On completion of the addition of the bright stock the product was mixed several hours while maintaining the temperature at about 100° C. There was obtained 942 grams of product which had the following composition and properties:

Composition (calculated) wt. percent:
  Pb sulfonate _____ 15
  Excess Pb (as PbO) _____ 15
  Nonvolatile oil _____ 70

Properties:
  Penetration, at 77° F. _____ 285
  60 stroke penetration, at 77° F. _____ 339
  10,000+60 stroke penetration, at 77° F. __ 320
  Dropping point, ° F. _____ 333

Water washout (percent):
  100° F. _____ 0.05
  175° F. _____ 10.25

EXAMPLE 5

A product prepared in a manner similar to that of Example 2 had the following properties:

Shell 4-ball test results:
  Weld point _____kg__ 300
  Wear _____mm__ 0.928
  Load wear index _____ 53
  No seizure load _____kg__ 63

The data shown above indicate that the grease composition of our invention is useful under conditions of extreme pressure.

EXAMPLE 6

This example is comparative and shows that the carbonated overbased lead dispersion does not produce a thixotropic product.

The type and amounts of materials used were the same as shown in Example 1.

The procedure used was the same as described in Example 1 with the exception that, after heating at 90° C. for two hours and adding the pale oil, the admixture was blown with $CO_2$ for 25 minutes.

The conversion step was conducted as described in Example 2. The resulting product weighed 316.1 grams. To make it comparative with the product of Example 2 additional Stoddard solvent was added bringing the total product weight to 345 grams. This product had the following viscosity:

Cps. at 77° F. (Brookfield No. 3 Spindle, 12 r.p.m.) less than 100

EXAMPLE 7

This example is also comparative and shows that the carbonated overbased lead dispersion does not produce a thixotropic product.

A carbonated, overbased lead dispersion was prepared using the materials and procedure described in Example 6.

The conversion step was conducted using the procedure of Example 2 with the exception that 15 grams of methoxy ethanol, as well as the 41.5 grams of water, were added. The resulting product weighed 315.9 grams. Additional Stoddard solvent was added bringing the total product weight to 345 grams. This product had the following viscosity.

Brookfield, No. 3 spindle—12 r.p.m., cps. at 77° F.—less than 100

EXAMPLE 8

This example is also comparative and shows that a carbonated overbased lead dispersion does not produce a thixotropic product. As nearly as possible the procedure used for preparing the carbonated overbased lead dispersion was that described in Example 42 (which refers to Example 2) of U.S. 3,384,586.

A 40% neutral lead sulfonate was prepared as follows:

Materials:
  60.0 grams petroleum sulfonic acid [1]
  32.4 grams 100 pale oil
  5.8 grams yellow lead oxide
  50 ml. methanol
  150 ml. hexane Analysis:
  Total acidity—0.860 meq./g.
  Sulfonic acidity—0.835 meq./g.
  Nonvolatiles, weight percent—62.75
  Combining weight (as $RSO_3H$)=500

The above-described materials were added to a 2-liter creased flask and refluxed for 30 minutes while employing mechanical agitation. The volatile materials were then removed by heating to a pot temperature of 155° C.

The carbonated, overbased lead sulfonate was prepared as follows:

Materials:
  75.3 grams (0.05 eq.) 40% lead sulfonate as prepared above
  77.2 grams (0.375 eq.) octyl phenol
  105 grams water
  402.5 grams 100 pale oil
  130.0 grams (1.16 eq.) yellow lead oxide
  285 grams Stoddard solvent

[1] "Sherosope" T.

The lead sulfonate, octyl phenol, water and pale oil were added to a reaction flask and heated, employing mechanical agitation, to a temperature of 82° C. The lead oxide was then added. (No significant temperature rise was observed.) The volatile materials distilling below 143° C. were removed by heating to a pot temperature of 143° C. The reaction mass was then blown with gaseous $CO_2$ at the rate of about 810 ml./minute for 100 minutes. At this point the reaction mass was considered to be substantially neutral. It was then diluted with the Stoddard solvent and filtered twice through Hyflo filter aid. A product was obtained which weighed 888 grams and was slightly hazy.

The product had the following analysis:

Sulfated ash 14.4% (wt.)
Percent active (as Pb sulfonate) 5.5
Metal ratio (based on sulfated ash) 9.7

Using the above-described carbonated, overbased lead sulfonate, three runs were made in an attempt to prepare a thixotropic product.

The materials used were as follows:

| | Run number | | |
|---|---|---|---|
| | A | B | C |
| Carbonated, overbased, lead sulfonate, grams | 200 | 200 | 200 |
| Water, grams | 20 | 20 | 20 |
| Methanol, grams | 16 | 16 | 16 |
| Isobutanol, grams | | | 8 |
| Stoddard solvent, grams | 60 | 60 | 60 |

The procedure used was as follows. The materials were added to a one-liter creased flask. Using mechanical agitation they were heated to reflux temperature (75° C.) and maintained at this temperature for 5 hours.

Run A was not processed any further but was cooled to ambient temperature. Runs B and C were heated to 150° C. to remove volatile materials. The amount of product obtained and the viscosity of the product for the three runs are shown below.

| | Run number | | |
|---|---|---|---|
| | A | B | C |
| Product weight, grams | 294.1 | 241.6 | ¹ 227.1 |
| Viscosity (Brookfield No. 3 Spindle, 12 r.p.m.) cps | <100 | <100 | <100 |

¹ Some material may have been lost during removal of volatiles because of excessive foaming.

EXAMPLE 9

This example shows the use of "added" alcohol in the conversion of the fluid, overbased lead sulfonate to the thixotropic, colloidal dispersion.

Materials: G.
Overbased lead sulfonate ¹ ---------------- 365
Water ----------------------------- ² 62
Methoxy ethanol ---------------- ³ 10

¹ In Stoddard solvent, it consisted of about 60% overbased lead sulfonate and about 40% Stoddard solvent. The overbased lead sulfonate was prepared using substantially the same material and substantially the same procedure shown in Example 1.
² 30 percent by weight, based on nonvolatiles.
³ 5 percent by weight, based on nonvolatiles.

Procedure.—The solution of overbased lead sulfonate was added to a one-liter flask and heated to 60–65° C. The water and methoxy ethanol were mixed and the mixture was added in three equal increments over a period of 20 minutes. The admixture was heated to reflux temperature and then maintained at reflux temperature for 2 hours. The volatile materials distilling below 155° C. were removed by heating to a pot temperature of 155° C. The amount of product was 290.7 grams. Additional Stoddard solvent was added to bring the total product weight to 345 grams. The product had the following viscosity.

Brookfield, No. 3 spindle, 12 r.p.m. cps. at 77° F.—1680

EXAMPLE 10

This example contains a series of runs and illustrates the effect of using varying amounts of water in the conversion step. No added alcohol was used since some residual alcohol was present in the overbased lead sulfonate.

| | Run Number | | | | |
|---|---|---|---|---|---|
| | A | B | C | D | E |
| Overbased lead sulfonate,¹ grams | 360 | 368 | 469 | 469 | 469 |
| Water, ml | 27 | 41.5 | 67.5 | 79.6 | 93.0 |
| Percent water ² | 12 | 20 | 25 | 30 | 35 |

¹ In Stoddard solvent, the overbased lead sulfonate was prepared using substantially the same materials and substantially the same procedure shown in Example 1. Runs C–E were aliquots of a pilot plant batch; Run B was an aliquot of a 12 liter preparation and Run A was a 1 liter preparation. The overbased, lead sulfonate had the following approximate composition.

| | Weight percent |
|---|---|
| Lead sulfonate | 17 |
| Lead (excess as PbO) | 18 |
| Oil | 22 |
| Stoddard solvent* | 43 |

*Including residual methoxy ethanol.
² By weight, based on nonvolatiles.

Procedure.—The procedure used for converting to the thixotropic, colloidal dispersion was substantially the same as in Example 2.

All of the products contained about 40% Stoddard solvent. They had the following viscosities.

| | Run Number | | | | |
|---|---|---|---|---|---|
| | A | B | C | D | E |
| Viscosity, cps. at 77° F.¹ | 1,748 | 1,436 | 4,505 | 5,050 | 1,760 |

¹ Brookfield, No. 3 spindle, 12 r.p.m.

The products had the following approximate composition:

Wt. percent
Lead sulfonate ---------------------------- 19
Lead (excess as PbO) --------------------- 18
Oil ------------------------------------- 23
Stoddard solvent ------------------------- 40

EXAMPLE 11

This example shows the use of acetic acid to convert the fluid, overbased lead dispersion to a thixotropic, colloidal dispersion.

The fluid overbased lead sulfonate was substantially the same as shown in Example 1. It was diluted with Stoddard solvent. Water and acetic acid were added (methoxy ethanol in some runs). The amount of acetic acid used was just sufficient to neutralize a calculated amount of dispersed lead oxide in the product. The admixture was refluxed for 2–3 hours. The volatile materials distilling below 155° C. were removed by heating to 155° C. The amounts of materials used and the appearance of the products are shown in the following table.

| | Run number | | |
|---|---|---|---|
| | A | B | C |
| Overbased lead sulfonate: | | | |
| Percent sulfonate | 35 | 40 | 35 |
| Percent Pb | 30 | 30 | 35 |
| Stoddard, percent ¹ | 30 | 25 | 40 |
| Water, percent ² | 10 | 10 | 13 |
| Acetic acid ³ | 66 | 66 | 33 |
| Methoxy ethanol, precent ⁴ | 1.0 | 1.0 | |
| Appearance, ambient | (⁵) | (⁵) | (⁵) |

¹ In some instances Stoddard was added after conversion to bring to this amount.
² Based on nonvolatile portion of overbased lead sulfonate.
³ This figure is amount, expressed as percent, of excess lead neutralized by the acetic acid.
⁴ Based on nonvolatile portion of overbased lead sulfonate.
⁵ Semi-solid.

EXAMPLE 12

The foregoing examples, which illustrate our invention, have shown the preparation of a thixotropic product from fluid, overbased lead dispersions having a metal ratio of about 5.5. This example shows the preparation of a thixotropic product from a fluid, overbased lead dispersion having a metal ratio of about 5.

A Stoddard solvent solution (40% by weight solvent) of a fluid overbased, lead sulfonate having the following analysis was used in this example.

In solvent:
  Lead, wt. percent _____ 18.1
  Lead sulfonate, wt. percent _____ 19.0
  Metal ratio _____ 4.95

Calculated, without solvent:
  Lead, wt. percent _____ 30.2
  Lead sulfonate, wt. percent _____ 31.7

The solution of fluid, overbased lead sulfonate (465 g.) was added to a one-liter flask. While using mechanical agitation, the solution was heated to 60° C. Then, 67.5 ml. of water were added to the flask in three equal increments over a period of 15 minutes. The admixture was heated to reflux (96° C.) and maintained at reflux temperature for two hours. The volatile materials distilling below 155° C. were removed by heating to a pot temperature of 155° C. The amount of product was 389.1 grams. Additional Stoddard solvent was added to bring the total product weight to 435 grams, and provide a product containing approximately 60% (weight) nonvolatiles. The product had a Brookfield viscosity (No. 3 spindle, 12 r.p.m.—77° F.) of 1600.

The invention having thus been described, what is claimed and desired to be secured by Letters Patent is:

1. A thixotropic, colloidal dispersion comprising:
  (a) from about 20 to about 95 parts by weight nonvolatile diluent oil,
  (b) from about 20 to about 45 parts by weight oil-soluble dispersing agent,
  (c) from about 15 to about 40 parts by weight substantially amorphous lead oxide,
said thixotropic colloidal dispersion being characterized further as having a dropping point of at least 200° F. and a metal ratio of at least 3.5.

2. The thixotropic, colloidal dispersion of claim 1 wherein the nonvolatile diluent oil is a mineral lubricating oil or a synthetic lubricating oil.

3. The thixotropic, colloidal dispersion of claim 2 wherein the oil-soluble dispersing agent is selected from the group consisting of sulfonic acids, carboxylic acids, metal sulfonates, metal carboxylates and mixtures thereof.

4. The thixotropic, colloidal dispersion of claim 3 wherein it comprises:
  (a) from about 25 to about 45 parts by weight nonvolatile diluent oil,
  (b) from about 30 to about 40 parts by weight oil-soluble dispersing agent, and
  (c) from about 28 to about 35 parts of substantially amorphous lead oxide.

5. The thixotropic, colloidal dispersion of claim 4 wherein the nonvolatile diluent oil is a mineral lubricating oil and the oil-soluble dispersing agent is a lead sulfonate.

6. A process for preparing a thixotropic, colloidal lead-containing dispersion, said process comprising heating at a temperature in the range of from about 50 to about 100° C. and for a time in the range of from about one-sixth to about ten hours an admixture which comprises:
  (a) a fluid, overbased lead dispersion having a metal ratio of at least 3.5 and comprising:
    (i) from about 20 to about 60 parts by weight nonvolatile diluent oil,
    (ii) from about 20 to about 45 parts by weight oil-soluble dispersing agent,
    (iii) from about 15 to about 45 parts by weight lead compounds, selected from the group consisting of lead oxide and lead alkoxides,
  (b) from about 10 to about 45 percent by weight, based on said fluid overbased lead dispersion, of an active hydrogen compound selected from the group consisting of water, water-alcohol mixtures and aliphatic carboxylic acids containing from 1 to 7 carbon atoms.

7. The process of claim 6 wherein the admixture is heated at reflux temperature.

8. A process for preparing a thixotropic, colloidal lead-containing dispersion, said process comprising heating at a temperature in the range of from about 50 to about 100° C. and for a time in the range of from about one-sixth to about ten hours an admixture which comprises:
  (a) a fluid, overbased lead dispersion having a metal ratio of at least 3.5 and comprising:
    (i) from about 20 to about 50 parts by weight nonvolatile diluent oil,
    (ii) from about 20 to about 45 parts by weight oil-soluble dispersing agent,
    (iii) from about 20 to about 45 parts by weight lead compounds selected from the group consisting of lead oxide and lead alkoxides,
  (b) from about 10 to about 45 percent by weight, based on said fluid overbased dispersion, of an active hydrogen compound selected from the group consisting of water, alcohol, and water-alcohol mixtures.

9. The process of claim 8 wherein the fluid, overbased lead dispersion is prepared from yellow lead oxide containing at least about 85 weight percent lead monoxide in the massicot form.

10. The process of claim 9 wherein the admixture is heated at reflux temperature.

11. The process of claim 10 wherein the alcohol is selected from the group consisting of aliphatic alcohols containing 1 to 4 carbon atoms, monoether alcohols of ethylene glycol containing 3 to 8 carbon atoms, and monoether alcohols of diethylene glycol containing 5 to 9 carbon atoms.

12. The process of claim 11 wherein the nonvolatile diluent oil is selected from the group consisting of mineral lubricating oils, synthetic lubricating oils and mixtures thereof.

13. The process of claim 12 wherein the oil-soluble dispersing agent is selected from the group consisting of sulfonic acids, carboxylic acids, metal sulfonates, metal carboxylates and mixtures thereof.

14. The process of claim 13 wherein the amount of active hydrogen compound, based on said fluid overbased dispersions, is from about 20 to about 35 percent by weight.

15. The process of claim 14 wherein the active hydrogen compound comprises a water-alcohol mixture containing from about 0.5 to about 10 parts of water by weight per part of alcohol.

16. The process of claim 15 wherein the alcohol is a monoether alcohol of ethylene glycol containing 3 or 4 carbon atoms.

17. The process of claim 16 wherein the active hydrogen compound is a water-alcohol mixture containing from about 1.8 to about 4.5 parts by weight of water per part of methoxy ethanol.

18. A process for preparing a thixotropic, colloidal dispersion containing substantially amorphous lead oxide, said process comprising heating for a time in the range of from about one-sixth to about ten hours an admixture which comprises:
  (a) a fluid, overbased lead dispersion having a metal ratio of at least 3.5 and comprising:
    (i) from about 25 to about 45 parts by weight mineral lubricating oil,
    (ii) from about 30 to about 40 parts by weight of the lead salt of an oil-soluble sulfonic acid,
    (iii) from about 28 to about 35 parts by weight lead compounds selected from the group consisting of lead oxide and lead alkoxides, (b) from about 20 to about 35 percent by weight, based on said fluid overbased lead dispersion, of an active hydrogen compound selected from the group consisting of water, alcohol and water-alcohol mixtures, wherein the alcohol is selected from the group consisting of aliphatic alcohols containing 1 to 4 carbon atoms, monoether alcohols of ethylene glycol containing 3 to 8 carbon atoms and monoether alcohols of diethylene glycol containing 5 to 9 carbon atoms, (c) 20 to 80 parts, per 100 parts of fluid, overbased lead dispersion of a volatile hydrocarbon solvent.

19. The process of claim 18 wherein the fluid, overbased lead dispersion is prepared from yellow lead oxide containing at least about 85 weight percent lead monoxide in the massicot form.

20. The process of claim 19 wherein the admixture is heated at reflux temperature.

21. The process of claim 20 wherein the alcohol, which is used as an active hydrogen compound, is a monoether alcohol of ethylene glycol containing 3 or 4 carbon atoms.

22. The process of claim 21 wherein the active hydrogen compound comprises a water-alcohol mixture containing from about 0.5 to about 10 parts by weight per part of alcohol.

23. The process of claim 22 wherein the active hydrogen compound is a water-alcohol mixture containing from about 1.8 to about 4.5 parts by weight of water per part of methoxy ethanol.

24. The process of claim 23 wherein the reflux time is from about 1 to about 4 hours.

References Cited

UNITED STATES PATENTS 3,471,403  10/1969  Le Suer et al. _____ 252—18

DANIEL E. WYMAN, Primary Examiner

I. VAUGHN, Assistant Examiner

U.S. Cl. X.R.

252—35, 39, 389